United States Patent [19]

Berry et al.

[11] Patent Number: 4,999,894
[45] Date of Patent: Mar. 19, 1991

[54] 5TH AXIS MACHINING CENTER FIXTURE

[75] Inventors: Dennis L. Berry, Lima, Ohio;
Douglas K. Money, Coraopolis, Pa.

[73] Assignee: Westinghouse Electric Corp., Pittsburgh, Pa.

[21] Appl. No.: 330,240

[22] Filed: Mar. 29, 1989

[51] Int. Cl.$^5$ .............................................. B23Q 3/02
[52] U.S. Cl. ................... 29/33 P; 409/131; 409/221; 409/224; 269/309
[58] Field of Search ............... 29/33 P, 563, 565, 568; 409/221, 222, 223, 224; 414/744.3, 744.8; 408/71; 198/364.1, 465.1, 465.2; 269/58, 70, 309

[56] References Cited

U.S. PATENT DOCUMENTS

| | | | |
|---|---|---|---|
| 531,817 | 1/1895 | Warren | 409/222 |
| 4,484,387 | 11/1984 | Nachmany | 29/568 |
| 4,503,373 | 3/1985 | Nozawa et al. | 318/570 |
| 4,529,342 | 7/1985 | Babel | 409/224 X |
| 4,534,546 | 8/1985 | Cattani | 269/58 |
| 4,550,532 | 11/1985 | Fletcher, Jr. et al. | 51/288 |

Primary Examiner—Z. R. Bilinsky
Attorney, Agent, or Firm—R. P. Lenart

[57] ABSTRACT

A workpiece positioning fixture for use in a multiple axis machining center having a pallet and a tool holder, and being capable of changing the relative positions of the pallet and tool holder along X, Y and Z linear axes and along a B rotational axes, includes a base, a workpiece holder, and a structure for rotating the workpiece holder in response to circular interpretation of the tool holder with respect to the base. When the workpiece holder reaches its desired angular orientation, a locking pin is used to prevent rotation of the workpiece during the machining operation.

4 Claims, 4 Drawing Sheets ically more complex and expensive than four axis machining centers. It is therefore desirable to devise a workpiece positioning fixture which would permit the automated machining of multiple compound angle workpiece features in a four axis machining center.

5TH AXIS MACHINING CENTER FIXTURE

BACKGROUND OF THE INVENTION

This invention relates to workpiece positioning devices for use in computer controlled machining centers and, more particularly, to such devices which provide for rotation of the workpiece about an additional axis for the machining of compound angle features on the workpiece.

Four axis machining centers provide for relative movement between a workpiece and a tool in three mutually orthogonal directions (X, Y and Z axes in a Cartesian coordinate system) and rotation about the center line of one of the linear axes. Such machining centers are extremely versatile and can perform a wide range of machining operations. However, when compound angle features of the workpiece must be machined, a fifth axis is required. The required workpiece positioning can be accomplished manually through the use of a custom designed fixture for holding the workpiece. Where the workpiece includes more than one compound angle feature that must be machined, separate fixtures are required for each of the workpiece features.

Alternatively, a five axis machining center can be used to machine multiple compound angle features on a workpiece. Five axis machining centers are considerably more complex and expensive than four axis machining centers. It is therefore desirable to devise a workpiece positioning fixture which would permit the automated machining of multiple compound angle workpiece features in a four axis machining center.

SUMMARY OF THE INVENTION

The present invention provides a workpiece positioning fixture for use in a multiple axis machining center having a pallet for supporting a workpiece and a tool for performing various machining operations wherein the relative position between the pallet and the tool can be varied along X, Y and Z mutually orthogonal linear axes and along a first rotational axes about a center line of one of the linear axes, and wherein the fixture includes a base, a workpiece holder and a structure for rotating the workpiece holder through a predetermined angle of rotation in response to a preselected amount of circular interpolation of a tool holder with respect to the base of the fixture.

The invention also encompasses a method of providing a predetermined amount of rotation of a workpiece in a first rotational axis direction in a multiple axis machining center having a workpiece supporting pallet, a machining tool, and means for changing the relative position of the pallet and the tool along X, Y and Z mutually orthogonal linear axes and along a second rotational axes about a center line of one of the linear axes with the method including the steps of providing a fixture having a base; providing a workpiece holder; and rotating the workpiece holder through a predetermined angle of rotation in response to a preselected amount of circular interpolation of a machine tool holder with respect to the base.

The above fixture and positioning method permit the automated positioning of a workpiece in a computer controlled machining center such that multiple compound angle features of the workpiece can be machined without the need for separate fixtures for each of the features.

DESCRIPTION OF THE PREFERRED EMBODIMENT

Figure 1:
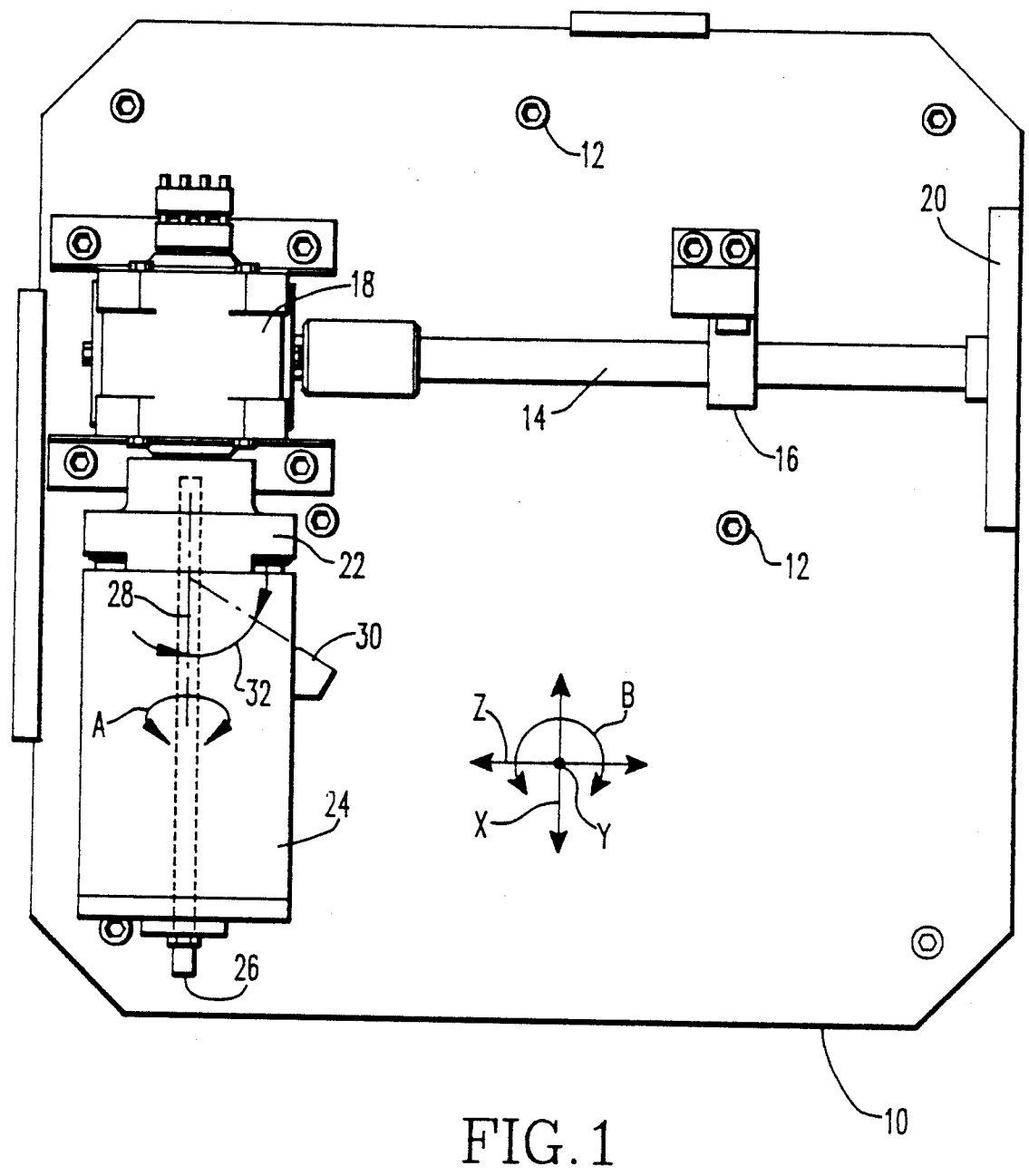
FIGS. 1, 2 and 3 are top, side and end views of a fixture constructed in accordance with the present invention.

Referring to the drawings, FIG. 1 is a top view of a machining center fixture constructed in accordance with one embodiment of the present invention. A base 10 is mounted upon a pallet of the machining center and secured to the pallet by way of bolts 12. The pallet is capable of being driven in accordance with well known technology along any of three mutually orthogonal linear axes X, Y and Z and is also capable of being rotated along a line parallel to or coincident with the Y axis. Such rotation is commonly referred to as rotation in the B axial rotation direction. An input shaft 14 is supported by a bearing 16. One end of the input shaft is connected to a commercially available gear reducer 18. The other end of the input shaft carries a driving mechanism 20 which is used in combination with circular interpolation of a collet or end mill tool holder to rotate the shaft. A workpiece holder 22 is connected to the output of the gear reducer. A workpiece 24 which in this example is the housing of a dynamoelectric machine, is coupled to the workpiece holder by way of a bolt 26. Through the operation of the gear reducer, rotation of the input shaft 14 causes the workpiece to rotate about is center line 28. Such rotation is commonly called rotation in the A axial direction.

The fixture of FIG. 1 is used to position the workpiece 24 to permit machining of a surface 30 which lies on an angle 32 with respect of the center line of the workpiece.

Figure 2:
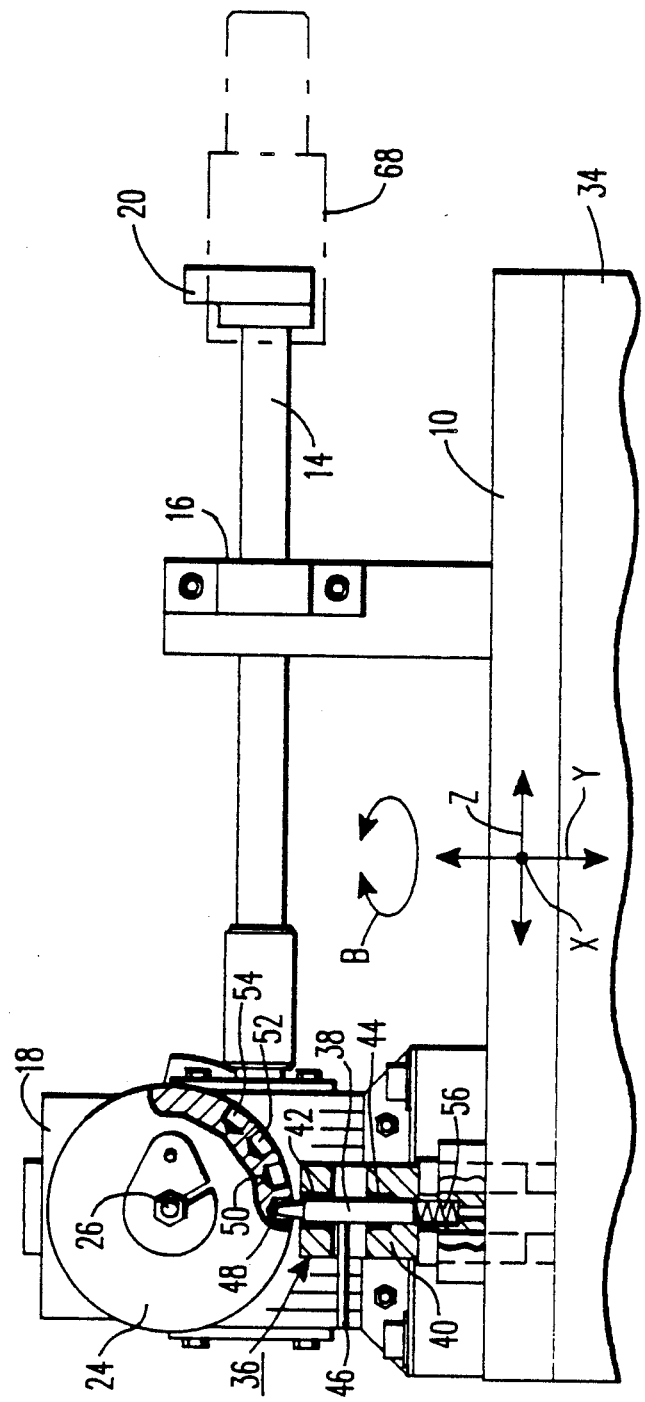

FIG. 2 is a side view of the fixture in FIG. 1. This view shows the pallet 34 upon which the fixture is mounted and also shows a locking mechanism 36 used to prevent rotation of the workpiece during the actual machining operation. The locking mechanism includes a locking pin 38 positioned within a pin holder 40. Bushings 42 and 44 keep the locking pin in position so that it must be driven up or down by a locking pin actuator 46. When the locking pin is moved upward, a portion of the pin enters one of four openings 48, 50, 52 or 54 in the workpiece holder. A biasing spring 56 serves to ensure that the locking pin remains within one of the openings in the workpiece holder to counteract the cutting forces which tend to rotate the workpiece during the actual machining operation.

Figure 3:
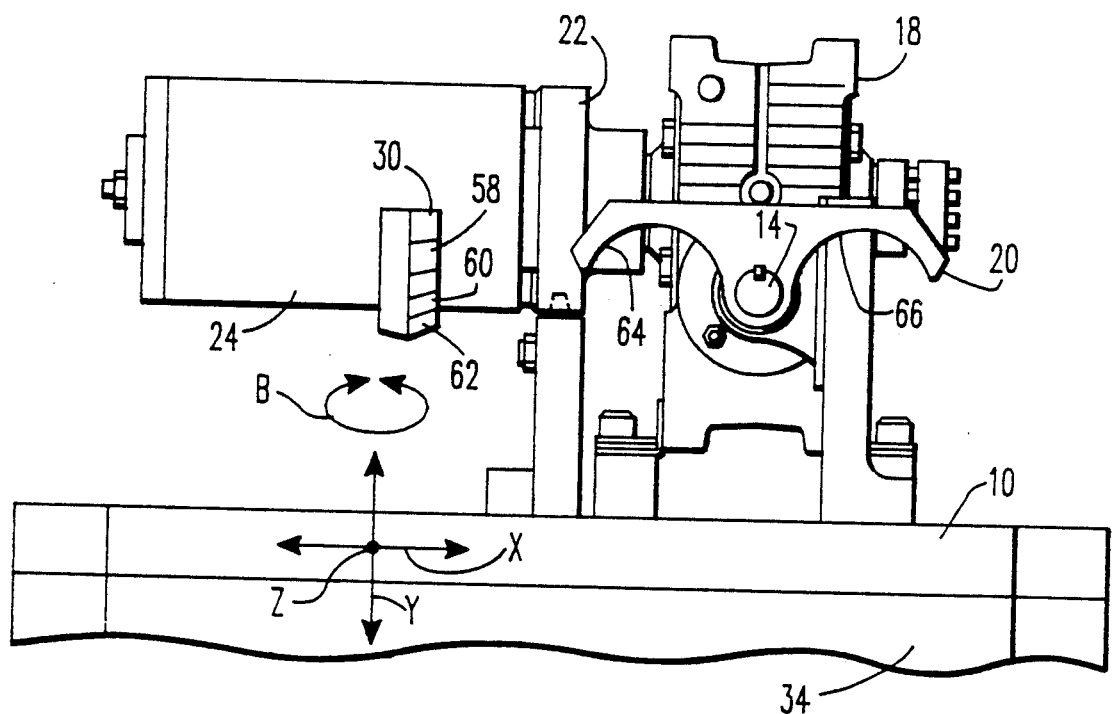
Figure 4:
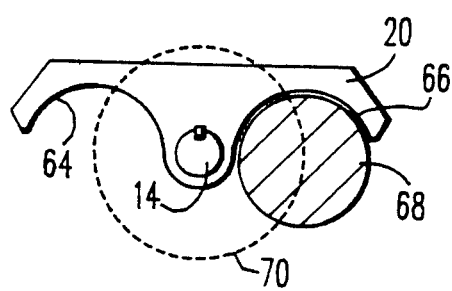
FIG. 4 is an end view of the driving mechanism for the input shaft of the fixture of FIGS. 1, 2 and 3.

Openings 48, 50, 52 and 54 are circumferentially displaced at predetermined angles in the workpiece holder which correspond to the circumferential displacement of surfaces 30, 58, 60 and 62 on the workpiece as illustrated in FIG. 3. These surfaces serve as connector bosses on housing 24. FIG. 3 also shows a pair of arcuate portions 64 and 66 of the driving mechanism for the input shaft 14. As illustrated in FIG. 4, these arcuate portions accept a collet or end mill tool holder 68 of the type commonly used in horizontal machining centers. When the tool holder 68 is driven by circular interpolation in the X and Y axial directions along circle 70, shaft 14 is rotated. By rotating shaft 14 through a predetermined angle of rotation, the tool holder undergoes a preselected amount of circular rotation which is controlled by the ratio of the gear reducer 18. Once the desired rotation of the work piece holder is achieved, the locking pin is inserted into one of the openings in the workpiece holder to prevent rotation of the workpiece during the actual machining operation.

Rotation of the driving mechanism 20 may be in either the clockwise or counterclockwise direction. The number of degrees of circular interpolation of the collet or end mill tool holder is determined by the required workpiece angle and the ratio of the gear reducer.

Figure 6:
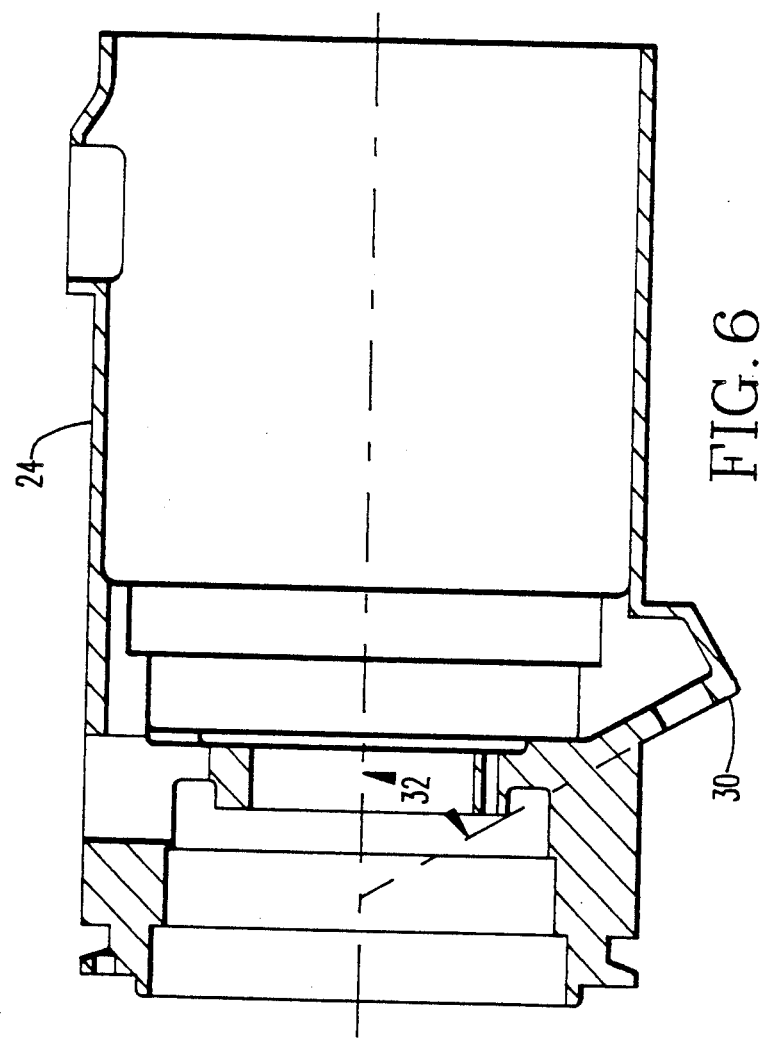
FIG. 6 is a longitudinal cross-sectional view of the workpiece of FIG. 5.
Figure 5:
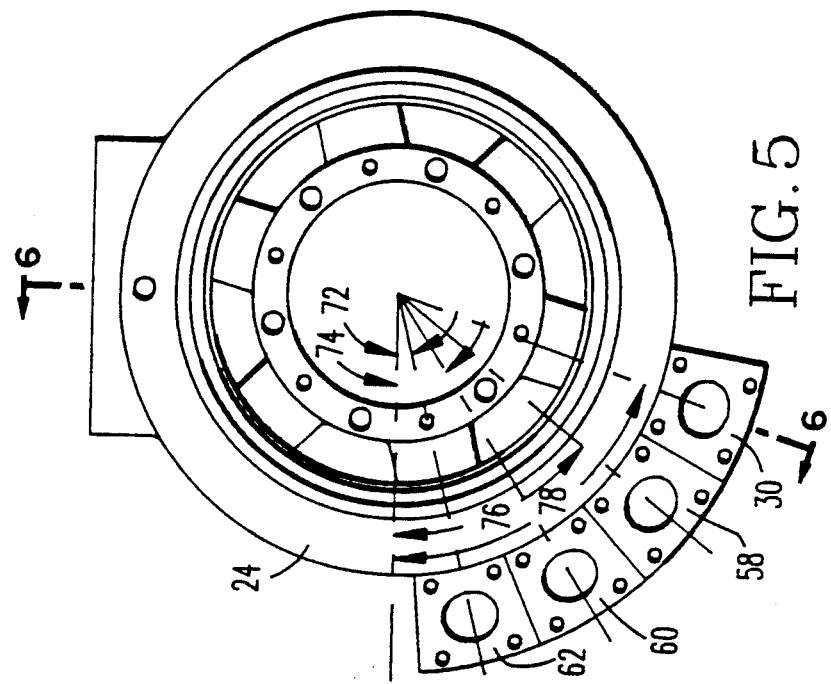
FIG. 5 is an end view of a workpiece having a compound angle feature.

FIG. 5 is an end view of the workpiece shown in the previous figures, and FIG. 6 is a longitudinal cross-sectional view of the workpiece. These two Figures illustrate the compound angle features (surfaces 30, 58, 60 and 62) for which this invention facilitates machining. Each of the surfaces lies at an angle 32 with respect to the center line of the workpiece, and is also circumferentially displaced (at angles 72, 74, 76 or 78) around the surface of the workpiece. Each surface is milled at the proper angle and openings are subsequently drilled as illustrated in FIG. 5.

It should now be apparent that the fixture of this invention changes a circular arc machine movement into a rotation of the workpiece in a fifth axis. This movement is accomplished by programming the machine to move in a circular arc motion and drive the input shaft of a gear reducer. The gear reducer changes its input shaft rotation into rotation of a workpiece which is attached to the output of the gear reducer. With the high accuracy positioning and programming ability of commercial machining centers, and the accuracy of a precision gear reducer, positioning of the workpiece in the fifth axis can be controlled to within or plus or minus one minute of a degree.

In order to change the orientation of the workpiece, the machining center is programmed to select and load the appropriate collet, chuck or endmill tool holder into the machine spindle. Then this tool holder is driven down to the correct coordinate position so that the locking pin actuator can be engaged into an opening in the end of the tool holder. This pin is then driven down to the unlocked position. Next the tool holder is disengaged and the machining center is repositioned such that the tool holder is engaged in the input shaft drive mechanism. The tool holder is then driven in a circular arc via circular interpolation of the X and Y axes. The exact number of degrees of this circular arc is determined by the workpiece requirement and the gear reducer ratio. After the proper arc movement has occurred, the tool holder is disengaged from the input shaft drive mechanism. The machining center is then repositioned such that the tool holder can be engaged with the locking pin once again. The tool holder is then driven to move the locking pin actuator into the locked position. Once complete, the tool holder is disengaged from the locking pin, removed from the machine spindle, and the machining of the workpiece is then resumed.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A workpiece positioning fixture for use in a multiple axis machining center having a pallet, a tool holder and means for changing the relative positions of the pallet and the tool holder along X, Y and Z linear axes and along a rotational axis, said fixture comprising:
   a base;
   a workpiece holder;
   means for rotating said workpiece holder through a predetermined angle of rotation in response to a preselected amount of circular interpolation of a tool holder with respect to said base;
   a locking pin;
   a locking pin actuator for coupling said locking pin to said tool holder;
   a locking pin holder mounted on said base, said locking pin holder permitting movement of said locking pin along a line perpendicular to an axis of rotation of said workpiece holder in response to a predetermined amount of linear movement of said tool holder with respect to said base; and
   a plurality of openings in said workpiece holder for receiving a portion of said locking pin.

2. A fixture as recited in claim 1, wherein said means for rotating comprises:
   a shaft;
   a gear reducer for coupling said shaft to said workpiece holder; and
   means for receiving said tool holder, said receiving means being mounted on said shaft such that rotation of said receiving means caused by said circular interpolation of said tool holder causes rotation of said shaft.

3. A fixture as recited in claim 1, wherein said portion of said locking pin is tapered.

4. A method of providing a predetermined amount of rotation of a workpiece in a first rotational axis direction in a multiple axis machining center having a pallet, a tool holder and means for changing the relative positions of the pallet and the tool holder along X, Y and Z linear axes and along a second rotational axis, said method comprising the steps of:
   providing a fixture having a base;
   providing a workpiece holder;
   rotating said workpiece holder through a predetermined angle of rotation in response to a preselected amount of circular interpolation of a tool holder with respect to said base; and
   locking said workpiece holder at said predetermined angle of rotation following said preselected amount of circular interpolation of said tool holder, by inserting a locking pin into one of a plurality of openings in said workpiece holder in response to a predetermined amount of linear movement of said tool holder with respect to said base.

* * * * *